Patented Apr. 13, 1954

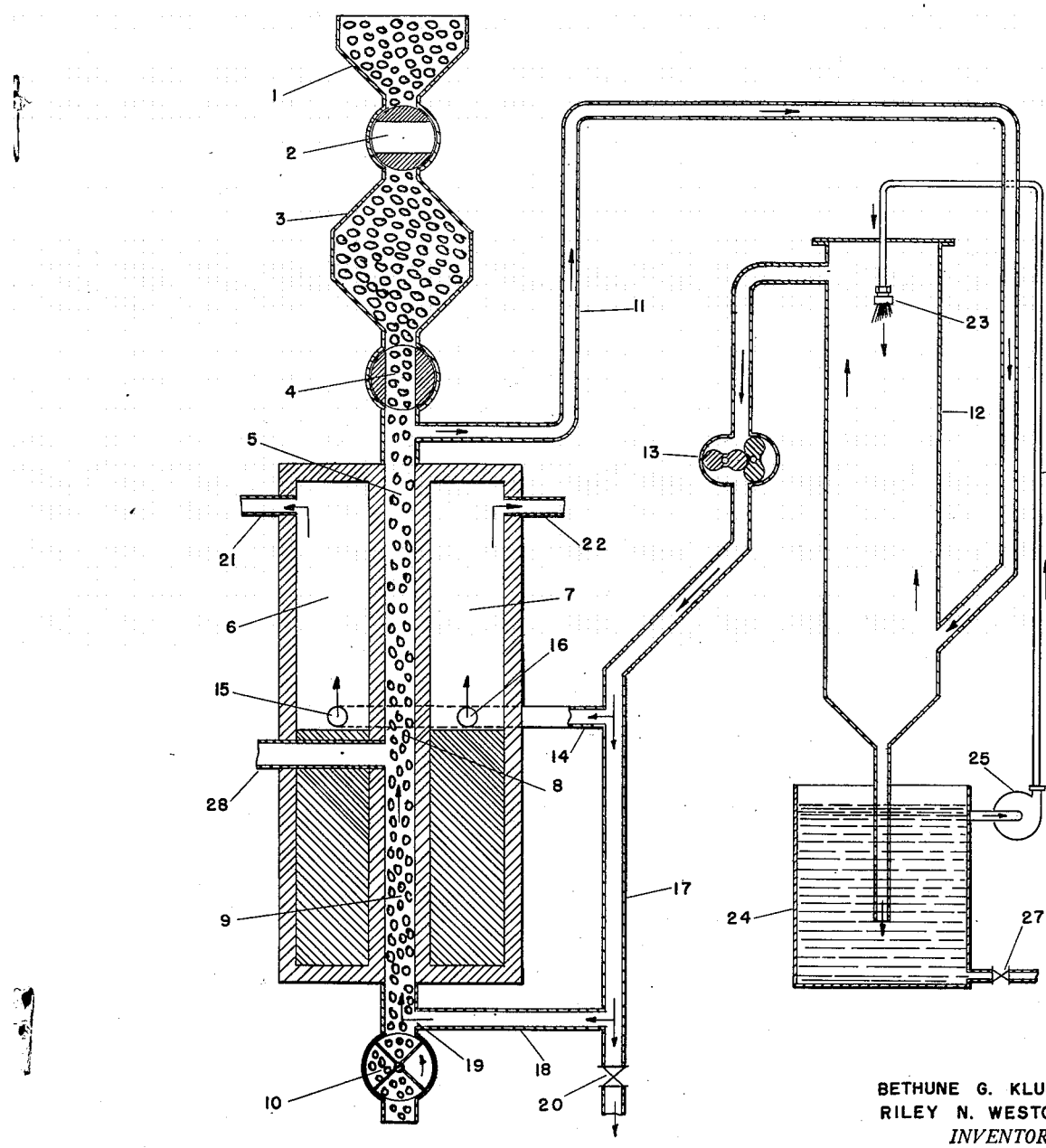

2,675,307

UNITED STATES PATENT OFFICE 2,675,307

PROCESS FOR COKING-CALCINING COMPLETE SMELTING CHARGE AGGREGATES

Bethune G. Klugh and Riley N. Weston, Anniston, Ala., assignors to Monsanto Chemical Company, St. Louis, Mo., a corporation of Delaware Application August 4, 1949, Serial No. 108,466

9 Claims. (Cl. 75—28)

This invention is directed to a method of carrying out coking-calcining operations and particularly to effecting such operations in the preparation of the complete proportioned smelting charge for phosphorus-, calcium carbide- and similar furnaces.

In smelting operations in which reactions of carbon with other constituents take place at elevated temperatures, great advantages flow from the use of the complete properly proportioned charged constituents in intimate contact in stable physical form of substantially uniform size and containing only the essential reacting bodies, as compared with the usually employed loose charge of separate components. For example, consider the electrothermal production of elemental phosphorus in which the reactants are phosphate minerals, coke and a siliceous fluxing agent. With these three components loosely mixed together, segregation of each and all of them unavoidably takes place with the result that the primary or essential reaction is largely defeated. This causes undesirable side reactions resulting in loss of energy and formation of phosphides, carbides, silicides and other detrimental impurities. If the size of the components of the charge is varied, irregular resistance to gas passage in the stock column occurs with consequent irregular temperatures and irregular passage of reaction gases and phosphorus vapor through the charge, thus causing blows and dust producing blasts. Moreover, because of the foregoing irregularities, additional energy is required for the evolution of the components other than those required for the primary reaction such as $CO_2$, combined water, organic volatiles, $SO_2$ and the like.

In the ideal forming of the aggregated complete proportioned components of the smelting charge, the main reactants, fluxing agents and bituminous coal are intimately mixed in finely divided state. The amount of fluxing agents is predetermined by calculation from analysis, and the coal addition is such that the required proportion of carbon for reduction will obtain with its complete coking and devolatilization. The aggregates may be formed by any of several means including briquetting, extruding, balling, rolling or otherwise. Any form of aggregate will be subject to the same coking-calcining treatment from its raw state to produce the desired coked-calcined furnace charge preparation.

It is essential, in this coking-calcining operation, that several conditions prevail. The aggregates must be maintained in continuous motion during the coal devolatilization in order to prevent the adhering of the aggregates in the tar and bitumen exuding stage. The relative motion of the aggregates in the moving column thereof must be of adequately low magnitude to prevent impact breakage in this transitional stage.

The temperature of the aggregates must be raised gradually in order to prevent rupturing which will be effected by violent increase in temperature with extreme rate of gas evolution. The temperature must be raised to that required for complete devolatilization of the coal, and complete removal of all combined water, $CO_2$ and normal $SO_2$, with the other volatile elements being separated at temperatures around 950° C. to 1100° C.

The temperature of the aggregates must also be controlled so as to not exceed 1100° C. since temperatures up to this point will normally remove all the required calcination elements. However, in the case of the preparation of the phosphate smelting charge, it is preferred not to exceed 1050° C. since higher temperatures result in incipient reduction and evolution of phosphorus. It is also essential to maintain a reducing atmosphere in the column of aggregates undergoing the coking-calcining treatment.

After the aggregates have been heated to a temperature within the range of 950° C. to 1100° C. (or to 1050° C. in the case of a phosphate charge) and for a period of time sufficient to achieve complete devolatilization of the coal, the coked aggregates must be cooled down to below 200° C. in a reducing or neutral atmosphere, since with the resulting highly active carbon present, they will become ignited and completely burn out all the carbon if exposed to air at a temperature of 200° C. or above. Moreover, even at temperatures slightly above 200° C., water vapor will react with the finely divided, highly reactive carbon to form an explosive mixture of water gas.

The above necessary precautions have been determined by applicants through considerable experimentation in quest of a combination of means to conduct this process with desired degree of commercial economical operation. This discovered and developed means is the subect of the invention set forth in this application.

An example of the application of this process is indicated in a specific case of a phosphate smelting charge in which the component materials are phosphate materials and bituminous coal. In this case the phosphate materials and the ash of the coal supply the required fluxing agents. The analyses are tabulated below:

| Phosphate Material | Bituminous Coal | Raw Aggregates | Coked Calcined Aggregates |
|---|---|---|---|
| | Percent | Percent | Percent | Percent |
| $P_2O_5$ | 25.65 | | 21.11 | 24.05 |
| $SiO_2$ | 22.18 | 3.78 | 18.92 | 21.04 |
| $Al_2O_3$ | 4.28 | 2.22 | 3.92 | 4.47 |
| CaO | 36.96 | .42 | 30.49 | 34.74 |
| MgO | .10 | .10 | .10 | .11 |
| F | 2.83 | | 2.33 | 2.13 |
| $Fe_2O_3$ | 3.76 | 1.80 | 3.41 | 2.72 |
| $MnO_2$ | .20 | | .16 | .10 |
| $SO_3$ | .56 | | .46 | .21 |
| $Na_2O$ | .17 | .32 | .19 | .22 |
| $K_2O$ | .44 | | .36 | .40 |
| $CO_2$ | 1.47 | .36 | 1.28 | |
| $H_2O$ Comb | 1.83 | | 1.51 | |
| Undet | .58 | | .48 | .55 |
| Organic | .18 | | .15 | |
| O. Eq. F.[1] | −1.19 | | −.98 | −.89 |
| V. C. M.[2] | | 35.00 | 6.20 | |
| F. C.[3] | | 56.00 | 9.91 | 10.15 |
| | 100.00 | 100.00 | 100.00 | 100.00 |

[1] Oxygen equivalent of fluorine.
[2] Volatile carbonaceous material.
[3] Fixed carbon.

Coked-calcined aggregates assumed to recover 80% of F. and 93% of FC in raw aggregate treated; also metal oxides assumed to be reduced to the elemental state by volatile components evolved with gases.

The theoretical proportion of the phosphate material and coal for obtaining the required ratio of carbon for reduction in the completely coked-calcined aggregate in this case is 100 to 21.5. The theoretical yield of coked-calcined product is 87.77 to 100 of the raw phosphate material.

In the preparation of aggregates for phosphorus smelting, it is desirable to so proportion the bituminous coal, phosphate bearing material and fluxing agents as to provide a weight ratio of $SiO_2$ to CaO within the range of 0.55 to 1.00.

An important feature of this invention lies in the cooling of the coked-calcined aggregates from about 1000° C. to 200° C. by contact with the evolved gases from said coking calcining reactions; in cycling circuit. Thus, the outgoing aggregates in the processing procedure have their heat removed by this entering cold cycling gas, which heat is progressively transmitted to the following stream of aggregates for their heating.

Thermal and chemical calculations of the above analyses of materials under this treatment develop the following theoretical data, the base unit used being one pound of dry raw aggregates.

(a) B. t. u. in gases evolved in coking-calcining _____ 1358
(b) B. t. u. required for coking-calcining __ 882
(c) B. t. u. recovered in cycling cooling gas _ 468
(d) B. t. u. required for supplemental heating _____ 414

These calculations take into account the theoretical normal losses by radiation and conduction. From the above summary balance, it is obvious that the volatile combustible matter of the bituminous coal in the proportion to supply the required reducing carbon for the smelting of the phosphate material is much more than adequate for the thermal reactions of the coking-calcining operation, when this combined cooling and heat recovery system is employed. The utilization of this system is the objective of the present invention. The cooling and heat recovery by the cycling gas is by direct contact with the aggregates in the post coking-calcining stage, while the supplemental heating for effecting the coking-calcining reactions is by indirect effect.

This is illustrated by reference to the accompanying drawing.

The raw aggregates are fed from hopper 1 through a gas tight control valve 2 into a sealing chamber 3 and then through valve 4 into a coking calcining retort chamber 5, the upper portion of which is heated on either side by burning gases in combustion chambers 6 and 7. The aggregates descend at a controlled rate and reach the required temperature for complete devolatilization at the lower end 8 of the heating chamber. On continued descent in the lower or cooling section 9, the aggregates are cooled by direct contact with cycling gases and then discharged from the section by way of discharge device 10.

The evolved and cycling gases pass out of the column of the retort into gas exit 11 which leads to a cooling and tar separating system 12. From this system the cooled gases are removed by pump 13 and divided into two streams, one of which is conveyed via line 14 and ports 15 and 16 into combustion chambers 6 and 7 respectively and the other is led by lines 17 and 18 into the base of the aggregate column at connection 19.

The gases flowing through line 14 are supplied with the required amount of combustion air by a suitable means (not shown) and are then ignited in the combustion chambers 6 and 7 to provide heat for coking the charge in the upper part of retort chamber 5.

The cooled gases flowing via lines 17 and 18 enter the bottom of the stock column and cool the aggregates while at the same time being raised in temperature by the heat absorbed from the hot aggregates.

The excess evolved gases are discharged from system by way of valve 20.

The combustion gases from chambers 6 and 7 are exhausted through ports 21 and 22 in a highly heated state for disposal as desired.

The evolved and cycling gases from the retort 5 are sprayed with water or other suitable media in treating chamber 12 by means of a pipe spray 23, the water being discharged into reservoir 24 and continuously recycled by pump 25 via line 26 for treatment of additional gases. Tar and excess solution are discharged from the system by way of valve 27 for further treatment.

Modifications of the heating and cooling system as described may substitute extraneous gases for that evolved in the coking calcining reactions, in either or both these functions. For the indirect heating by other fuel, the combustion components will be introduced into the ports 15 or 16 from any suitable outside source. For cooling with extraneous gas it is brought into entry 19 and if not passed up through heating section of column is passed out through exit 28.

With materials of above example, the theoretical proportions of gases involved per pound of dry raw aggregates are as follows:

Cubic feet of evolved gases _____ 4
Cubic feet of cycling cooling _____ 13
Cubic feet of total gases _____ 17

From this it is evident that the volume of gases required for cooling is 3¼ times that currently evolved in the coking calcining reaction of the aggregates. This volume remains in practice continuously in the circuit and is subject to smooth control as repeatedly demonstrated in pilot plant practice by applicants.

The above description has been limited to the coking-calcining of phosphate aggregates, but it is to be understood that the method of the instant invention is applicable to a wide variety of materials.

For example, the above method may be applied to the manufacture of calcium carbide in which case there would be involved the use of natural carbonate of lime, by-product carbonate of lime, lime hydrate and calcined lime together with auxiliary reagents such as iron oxide for removal of phosphorus, silicon and aluminum. In addition, bituminous coal would be used to provide the reacting-, combining- and reducing carbon in the coked calcined product.

Moreover, this coking-calcining method is applicable to aggregates of raw materials for producing ferrosilicon, ferro aluminum silicon, calcium silicon, calcium aluminum silicon, fused alumina, silicon carbide, ferro titanium, ferrotungsten, ferroboron, ferrovanadium, ferromanganese, ferrozirconium and like products.

This method is further applicable to raw material aggregates in which the carbon bearing component has little or no volatile combustion content. Such includes carbon black, petroleum coke, fine coke and the like. In such case the cycling and heating gases will be extraneously provided but with no other change in the method herein described.

The aforedescribed thermal system is adaptable to the coking of coal aggregates without the use of smelting components. Therefore this invention includes the coking of coal aggregates, in briquetted or other suitable aggregate or solid form. Such provides a practical process for making low volatile coal fuel elements from high volatile coals.

This described system will also be useful in the treatment of wood either in solid forms of natural wood structure or of briquettes or other aggregates of comminuted wood with or without suitable binder.

The wood aggregates would be fed down through the column and discharged as uniform charcoal aggregates. The coking-calcined operation would be effected by indirect heating supplemented by that obtained from the cycling gas stream and the distillation products would be condensed from the cycling gas stream, all as described above in connection with the coking-calcining of the phosphate aggregates. If desired, the indirect heating section may be heated by means of extraneous fuel other than that of the evolved gases.

In the heat treatment of phosphate bearing minerals, there is usually evolution of fluorine bearing gases and fumes, which may cause considerable damage to vegetation, and through vegetation forager absorption, cause damage to live stock which ingest it causing fluorosis and other toxic and pathological effects. In this method of smelting charge preparation, the control of the fluorine effluent may be simply obtained by treatment of the evolved and cycling gases. Since the gas volume relative to that in the sintering and nodulizing beneficiation methods is very small and since the gas stream is definitely confined in the handling system, the fluorine absorption treatments are practically self contained. Modifications of the aforedescribed process details for the substantially complete elimination of fluorine contamination of the atmosphere would merely consist in acid and/or alkaline scrubbing solutions or electrostatic treatment of the gases.

In calcium carbide production by the conventional method of electrothermal treatment of loose mixtures of burned lime and coke, the impurities such as phosphorus, silicon, aluminum carbide and silicon carbide remain in the calcium carbide product, causing objectionable results in its use. Furthermore, silica in the charge is reduced and volatilized in which case its vapor migrates until it contacts carbon at the temperature at which silicon carbide is formed therewith. These objectionable reaction results are largely due to the isolation of the contaminant elements by segregation and change of position in the loose charge. In the application of the herein described method to the preparation of calcium carbide production charges, all the reactants in the aggregated form are in such intimate contact that no segregating reactions occur. If there be included in this aggregate sufficient iron to form magnetically susceptible alloys with the therein contained silicon, aluminum, phosphorus, manganese, titanium and the like, all these contaminants will be thus automatically separated from the $CaC_2$ product.

Application of this method may be extended to the preparation of a charge for producing calcium phosphide from phosphate bearing minerals and carbon bearing materials. The principal difference between this prepared charge and that of the phosphorus production charge is that of the higher proportion of carbon in case of the calcium phosphide, and relatively low proportion of flux materials.

An important and desirable alloy for the deoxidizing of steel is that of aluminum-silicon-iron. The ratios of the respective constituents may vary considerably. A desirable combination is one of about 30% iron, 35% silicon and 35% aluminum. This alloy has been used to advantage over that of ferrosilicon in briquetted mixtures with calcined dolomite in the Pidgeon magnesium process. This Al-Si-Fe alloy is difficult to make in the loose material smelting charge of conventional ferro alloy practice. With the component elements in stable intimate contact, the reduction and alloying is substantially complete with the iron coalescing and alloying agent being present in practically molecular proximity to the others as they reduce.

The preparation of the briquetted or otherwise agglomerated components with carbon reducing agent is rendered practicable and feasible by use of the herein described coking-calcining process. This Al-Si-Fe alloy may be produced from selected coal mine wastes in which the proportions required occur.

The production of calcium-silicon alloy is subject to more economic and technical control if the component members of the smelting charge is in proportioned aggregated form. The herein described method provides advantageous means of such preparation. This may be by forming the aggregates of silica and lime minerals with the required proportion of carbonaceous reducing agent and then coking-calcining.

The calcium-silicon smelting charge may also be prepared by intimate mixing of finely divided silica and calcium carbide with pitch binding agent, briquetting or otherwise agglomerating and coking-calcining by herein described method.

While any suitable agglomerating procedure may be employed for the purpose of forming aggregates, it is preferred to utilize the methods described and claimed in application Serial Number 164,323, filed May 26, 1950 in the name of Bethune G. Klugh, which case is assigned to the same assignee as the present application.

What I claim is:

1. The method of coking-calcining mineral aggregates comprising a mixture of carbonaceous material and a material selected from the group consisting of CaO-, aluminum- and phosphate-bearing materials, which consists in introducing a downwardly moving column of said aggregates into a vertical retort indirectly heating under non-oxidizing conditions the upper section of said downwardly moving column of aggregates to a temperature of about 950° C. to about 1100° C. to effect substantially complete removal of the volatile components of said aggregates, scrubbing said volatile components with an aqueous medium to cool said volatile components and remove tar therefrom, burning a portion of the scrubbed volatile components to produce heat for said indirect heating operation, recycling a sufficient amount of the remainder of said scrubbed volatile components through the lower section of said column of aggregates to cool same to a temperature below 200° C. and discharging said cooled aggregates from the bottom of said retort, said indirect heating being applied substantially throughout said upper section of said retort up to about the point of entry of said aggregates into said retort, said carbonaceous material in the initial mineral aggregates being employed in the proportions providing sufficient fuel for said indirect heating operation and also sufficient residual carbon in the coked-calcined product for substantially complete reduction of said CaO-, aluminum- and phosphate-bearing materials to calcium carbide, fused alumina and phosphorus, respectively, and said cooling operation being executed under non-oxidizing conditions.

2. The method of coking-calcining mineral aggregates comprising a mixture of coal and a material selected from the group consisting of CaO-, aluminum- and phosphate-bearing materials, which consists in introducing a downwardly moving column of said aggregates into a vertical retort, indirectly heating under non-oxidizing conditions the upper section of said downwardly moving column of aggregates to a temperature of about 950° C. to about 1100° C. to effect substantially complete removal of the volatile components of said aggregates, scrubbing said volatile components with an aqueous medium to cool said volatile components and remove tar therefrom, burning a portion of the scrubbed volatile components to produce heat for said indirect heating operation, recycling a sufficient amount of the remainder of said scrubbed volatile components through the lower section of said column of aggregates to cool same to a temperature below 200° C. and discharging said cooled aggregates from the bottom of said retort, said indirect heating being applied substantially throughout said upper section of said retort up to about the point of entry of said aggregates into said retort, said coal in the initial mineral aggregates being employed in the proportions providing sufficient residual carbon in the coked-calcined product for substantially complete reduction of said CaO-, aluminum- and phosphate-bearing materials to calcium carbide, fused alumina and phosphorus, respectively, and said cooling operation being carried out under non-oxidizing conditions.

3. The method defined in claim 2 in which the aggregates comprise a mixture of a CaO-bearing material and bituminous coal in the proportions providing in the coked-calcined product sufficient residual carbon for the electrothermal production of calcium carbide.

4. The method defined in claim 3 in which the aggregates contain burnt lime and a sufficient amount of iron-bearing material to produce ferroalloys with contaminants contained therein selected from the group consisting of silicon, aluminum, manganese, titanium and phosphorus.

5. The method defined in claim 2 in which the aggregates comprise a mixture of an aluminum-bearing material and bituminous coal in the proportions providing in the coked-calcined product sufficient residual carbon for reducing, alloying and separating impurities in the production of fused alumina.

6. The method of coking-calcining mineral aggregates comprising a mixture of coal and a material selected from the group consisting of CaO-, aluminum- and phosphate-bearing materials, which consists in introducing a downwardly moving column of said aggregates into a vertical retort, indirectly heating under non-oxidizing conditions the upper secton of said downwardly moving column of aggregates to a temperature of about 950° C. to about 1100° C. to effect substantially complete removal of the volatile components therefrom, scrubbing said volatile components with water to cool said volatile components and remove tar therefrom, burning a portion of said scrubbed volatile components to supply heat for said indirect heating operation, recycling a sufficient amount of the remainder of said scrubbed volatile components through the lower section of said column of aggregates in said retort to cool said aggregates to a temperature below 200° C., continuing the passage of the scrubbed volatile components from the lower section upwardly through said upper section of said downwardly moving column of aggregates to mix with the volatile components evolved therein, passing the mixture of volatile components thus obtained from the upper portion of said column of aggregates and recycling said mixture of volatile components to the foregoing steps of the method, said indirect heating being applied substantially throughout said upper section of said retort up to about the point of entry of said aggregates into said retort, said coal in the initial mineral aggregates being employed in the proportions providing in the coked-calcined product sufficient residual carbon for substantially complete reduction of said CaO-, aluminum- and phosphate-bearing materials to calcium carbide, fused alumina and phosphorus, respectively, and said cooling step being carried out under non-oxidizing conditions.

7. The method of coking-calcining aggregates containing bituminous coal and a phosphate bearing material, which consists in introducing a downwardly moving column of said aggregates into a vertical retort, indirectly heating under non-oxidizing conditions the upper section of said downwardly moving column of aggregates to a temperature of about 950° C. to about 1050° C. to effect substantially complete removal of the volatile components therefrom, scrubbing said volatile components with water to cool said volatile components and remove tar therefrom, burning a portion of said scrubbed volatile components to produce heat for said indirect heating operation, recycling a sufficient amount of the remainder of said scrubbed volatile components through the lower section of said column of aggregates in said retort to cool said aggregates to a temperature below 200° C. and discharging said cooled aggregates from the lower section of said retort, said indirect heating being applied substantially throughout said upper section of said retort up to the point of entry of said aggregates into said retort and said bituminous coal in the initial aggregates being employed in the proportions providing in the coked-calcined product sufficient residual carbon for substantially complete reduction of said coked-calcined product and said cooling operation being executed under non-oxidizing conditions.

8. The method defined in claim 7 in which the aggregates comprise a mixture of bituminous coal and a phosphate bearing mineral in the proportions providing in the coked-calcined product silica and calcium oxide in a $SiO_2/CaO$ weight ratio in the range of about 0.55 to about to about 1.00.

9. The method of coking-calcining mineral aggregates containing coal and a phosphate-bearing material, which consists in introducing a downwardly moving column of said aggregates into a vertical retort, preheating said downwardly moving column of said aggregates, indirectly heating under non-oxidizing conditions the upper section of said preheated downwardly moving column of aggregates to a temperature of about 950° C. to about 1050° C. to effect substantially complete removal of the volatile components from said aggregates, scrubbing said volatile components with water to cool same and remove tar therefrom, burning a portion of the scrubbed volatile components to produce heat for said indirect heating operation, recycling a sufficient amount of the remainder of said scrubbed volatile components through the lower section of said downwardly moving column of aggregates to cool same to a temperature below 200° C., continuing the passage of said scrubbed volatile components from the lower section of said column of aggregates through the upper section thereof to mix with the volatile components evolved therein, passing the mixture of volatile components from said section upwardly through said downwardly moving column of aggregates to supply heat for said preheating operation and recycling the volatile components from said preheating operation to the foregoing steps of the method and said indirect heating being applied substantially throughout said upper section of said retort up to the point of entry of said aggregates into said retort.

References Cited in the file of this patent

UNITED STATES PATENTS

| Number | Name | Date |
| --- | --- | --- |
| 827,075 | Bilfinger | July 31, 1906 |
| 969,502 | Taussig | Sept. 6, 1910 |
| 1,494,130 | Reid | May 13, 1924 |
| 1,655,981 | Barr | Jan. 10, 1928 |
| 2,015,336 | Bunce | Sept. 24, 1935 |
| 2,029,309 | Curtis | Feb. 4, 1936 |
| 2,113,520 | Smith et al. | Apr. 5, 1938 |
| 2,131,702 | Berry | Sept. 27, 1938 |
| 2,189,248 | Luscher | Feb. 6, 1940 |
| 2,190,293 | Malkomes | Feb. 13, 1940 |